United States Patent [19]
de la Cour

[11] Patent Number: 6,126,019
[45] Date of Patent: Oct. 3, 2000

[54] SEWAGE COLLECTOR FLIGHT

[75] Inventor: Pierre de la Cour, Coquitlam, Canada

[73] Assignee: Greentech Design Ltd., Langley, Canada

[21] Appl. No.: 09/330,978

[22] Filed: Jun. 14, 1999

[51] Int. Cl.⁷ .................................................. B01D 21/18
[52] U.S. Cl. .......................... 210/525; 210/526; 210/541; 198/731; 198/734
[58] Field of Search .................................... 210/523, 525, 210/526, 541, 542; 198/728, 731, 734

[56] References Cited

U.S. PATENT DOCUMENTS

| | | | |
|---|---|---|---|
| Re. 35,676 | 12/1997 | Wilcher | 198/731 |
| 3,313,422 | 4/1967 | Swenson | 210/526 |
| 3,394,816 | 7/1968 | Lowry | 210/526 |
| 4,663,042 | 5/1987 | Rasper | 210/525 |
| 5,511,649 | 4/1996 | Wilcher | 198/731 |

*Primary Examiner*—Christopher Upton
*Attorney, Agent, or Firm*—George A. Seaby

[57] ABSTRACT

A collector flight for use in a sewage settling or sedimentation tank includes an elongated, generally C-shaped, one-piece, extruded aluminum body defined by top and bottom, hollow, rectangular heads connected together at one corner by a planar web. Slots extend the length of each side of the heads to receive brackets used to connect the flight to chains which move the flights through a sedimentation tank. The slots are also used to mount accessories such as shoes and a combination wiper/skimmer strip on the flights.

5 Claims, 4 Drawing Sheets

SEWAGE COLLECTOR FLIGHT

BACKGROUND OF THE INVENTION

1. Field of the invention

This invention relates to a sludge collector flight for use in a sewage settling or sedimentation tank.

2. Discussion of the Prior Art

Sewage treatment plants contain sedimentation or settling tanks for receiving waste water. Typically such tanks include a longitudinal collector trough for receiving sewage for settling, and a cross collector trough at a discharge end of the longitudinal trough for moving the sewage to a discharge outlet from the tanks. Collector flights mounted on drive chains extending transversely of the troughs scrape sedimentation from the bottom of the tanks and skim waste from the top surface of the waste water.

Examples of cross collector flights or parts thereof are disclosed by U.S. Pat. Nos. 3,394,816, which issued to J.A. Lowry on Jul. 30, 1968; 4,663,042, which issued to Susan M. Rasper et al on May 5, 1987; 5,398,805, which issued to Frank A. Esposito et al on Mar. 21, 1995 and Re. 35,676, which issued to Stephen B. Wilcher on Dec. 2, 1997.

As mentioned above, collector flights extend transversely of a settling tank. The flights are connected to a pair of chains by brackets. Carrying/wear shoes and guiding/return shoes are mounted on the top and bottom of the flights for prolonging the life of the flights and facilitating movement of the flights in the tank by centering and guiding the flights on rails in the tank. In existing apparatuses of the above described type, the combination brackets/chain links and/or carrying/wear and guiding/return shoes are attached to the collector flights by bolts, which extend through the bodies of the flights. Thus, production of the flights is somewhat expensive, because it is necessary to extrude the flights, and then drill holes in the bodies of the flights for receiving bolts. The presence of pre-drilled holes does not allow for adjustability, i.e. varying the position of the chains with respect to the ends of the flight body. Moreover, fiberglass flights when predrilled deteriorate when exposed to water. In other words, the flights must be custom made for each tank, and each drilled hole must be treated.

GENERAL DESCRIPTION OF THE INVENTION

An object of the present invention is to provide a relatively simple, strong, lightweight collector flight for use in a sewage settling tank which is free of pre-drilled holes and which is easy to mount on chains.

Another object of the invention is to provide a collector flight which will facilitate the mounting of accessories such as carrying/wear and guiding/return shoes in various positions on the flight. Installation of a PVC wiper/skimmer on the collector flight is also possible.

The above objects are met by a collector flight for use in a sewage sedimentation tank which includes chains for moving a plurality of flights through sewage in the tank, said flight comprising an elongated body; a hollow head on each of top and bottom ends of the body; and a slot extending the length of the front and rear of each said head for receiving connectors for mounting the flight on said chains and for attaching accessories to the body.

The body of the flight is preferably formed of extruded aluminum for minimum weight. The use of aluminum means that the flight is environmentally friendly, since the flight can be recycled at the end of its useful life. Aluminum flights can be repaired and welded on site, or removed and repaired in a shop. Because there are no predrilled holes in the body of the flight, the flight can readily be adapted to a variety of settling tanks merely by cutting the body to the length suited to the tank width.

BRIEF DESCRIPTION OF THE DRAWINGS

The invention is described below in greater detail with reference to the accompanying drawings, which illustrate a preferred embodiment of the invention, and wherein.

DESCRIPTION OF THE PREFERRED EMBODIMENT

Figure 1:
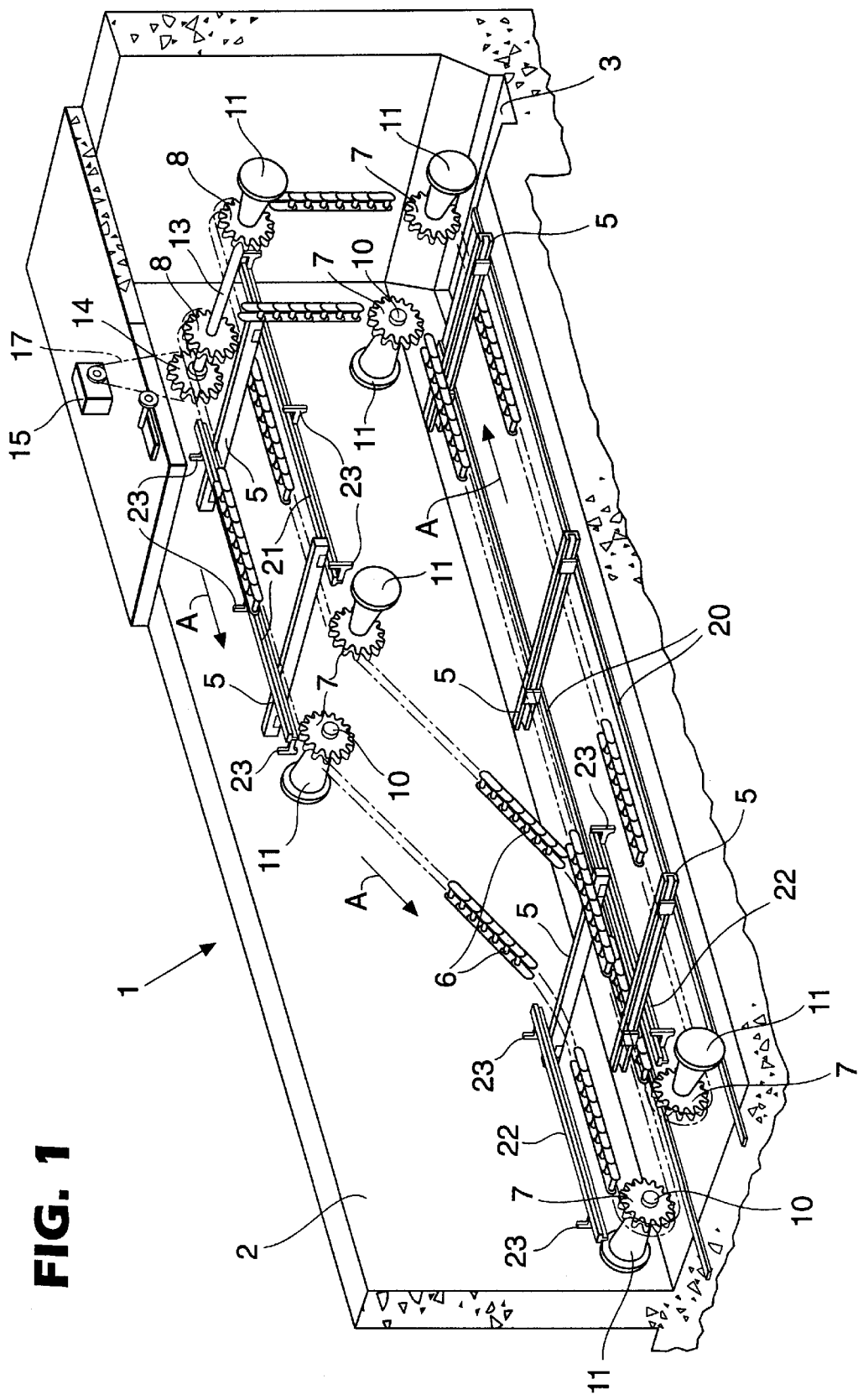
FIG. 1 is a schematic, isometric view of a sewage sedimentation or settling tank.

Referring to FIG. 1, a typical water sewage sedimentation tank, which is generally indicated at 1 is a concrete structure including a longitudinally collector trough 2 for receiving sewage for settling, and a cross collector trough 3 at a discharge end of the tank. Froth is skimmed from the top surface of waste water (not shown) in the tank, and sedimentation is scraped from the bottom of the tank 1 by a plurality of collector flights 5 (only a few shown) which are mounted on a pair of spaced apart chains 6.

The chains 6 pass around a plurality of sprockets 7 and 8 in the direction of arrows A. The sprockets 7 are mounted on the outer ends of shafts 10 extending out of bearing assemblies 11 mounted on the walls of the tank 1.

The sprockets 8 are mounted on a shaft 13 extending across the tank 1 between bearing assemblies 11 (one shown). A third sprocket 14 mounted on the shaft 13 is driven by a drive assembly 15, including a chain 17. The chain 17 is tensioned using a chain tensioner 18.

During passage along the bottom of the tank 1, the collector flights 5 slide on bottom tracks 20. When returning to the leading or inlet end of the tank 1, the flights 5 slide on tracks 21 and 22. The tracks 21 and 22 are supported by brackets 23 mounted on the sides of the tank 1.

A similar arrangement (not shown) of chains and collector flights is provided in the cross collector channel 3, which discharges sludge from the tank 1.

The basic elements described above are standard equipment. However, the flight 5 illustrated schematically in FIG. 1 and described below in detail is believed to be unique.

Figure 2:
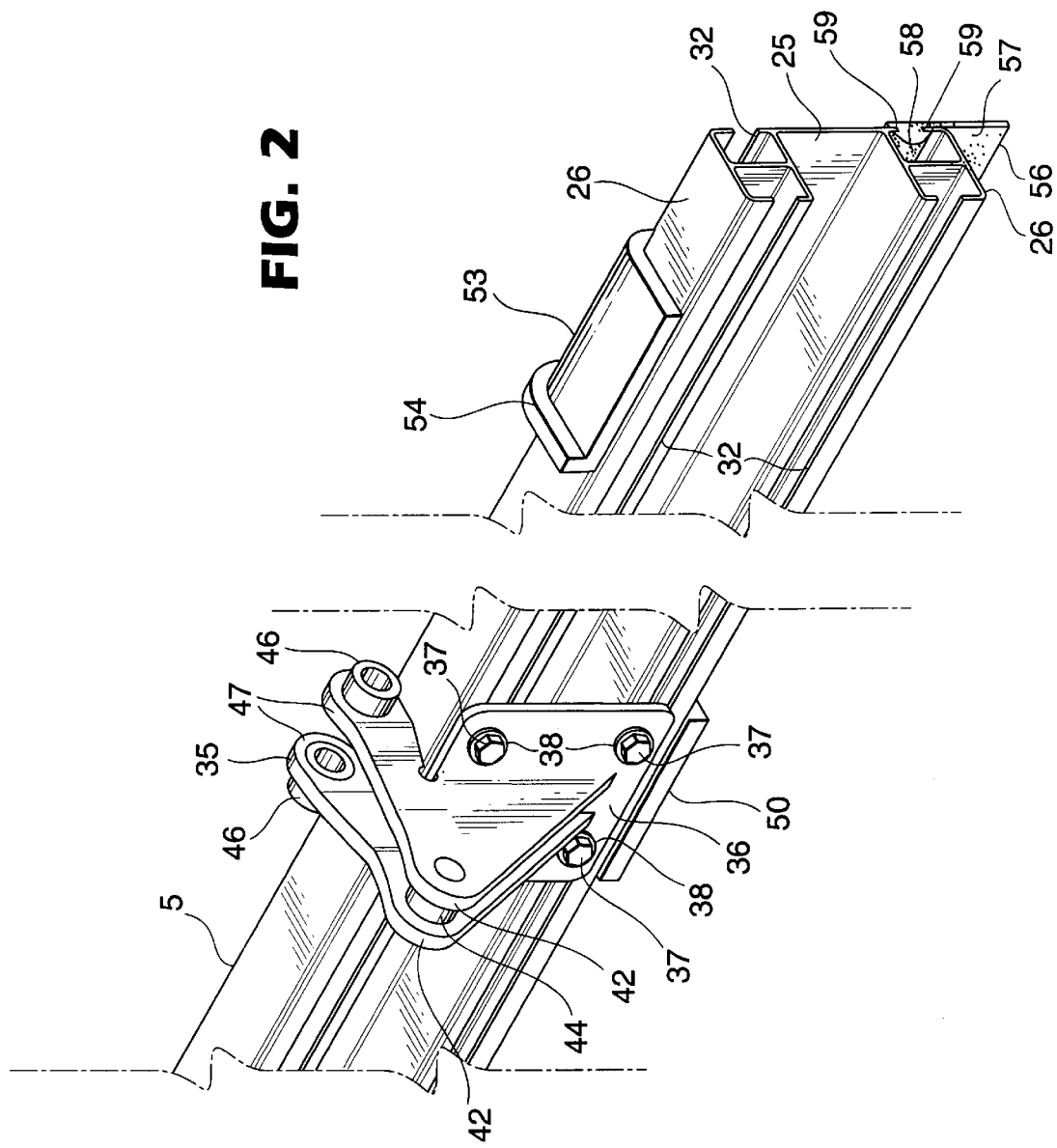
FIG. 2 is a schematic, isometric view of one end of a longitude or cross collector flight in accordance with the present invention as seen from above.
Figure 3:
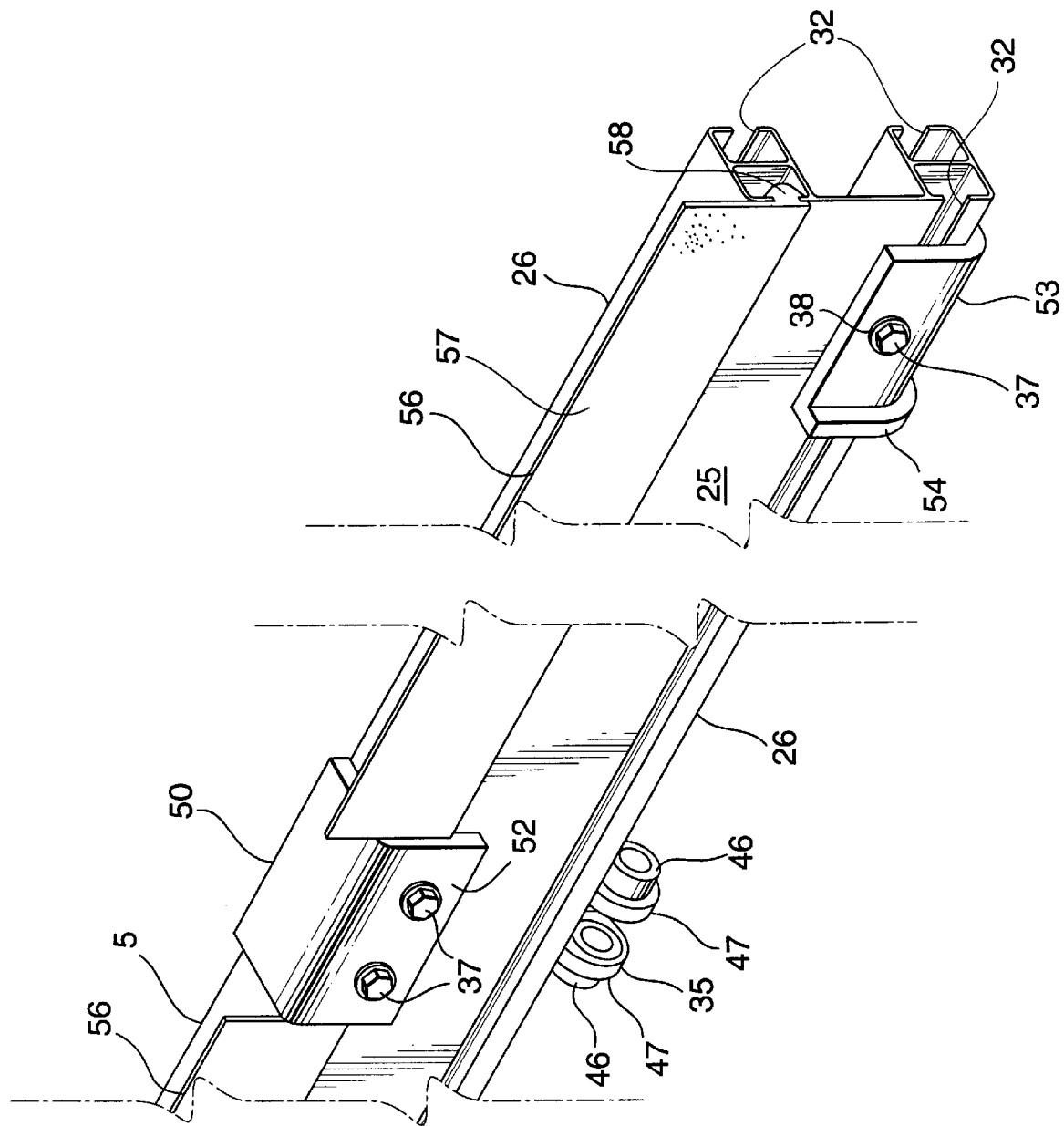
FIG. 3 is a schematic, isometric view of one end of the flight of FIG. 2 as seen from below.
Figure 4:
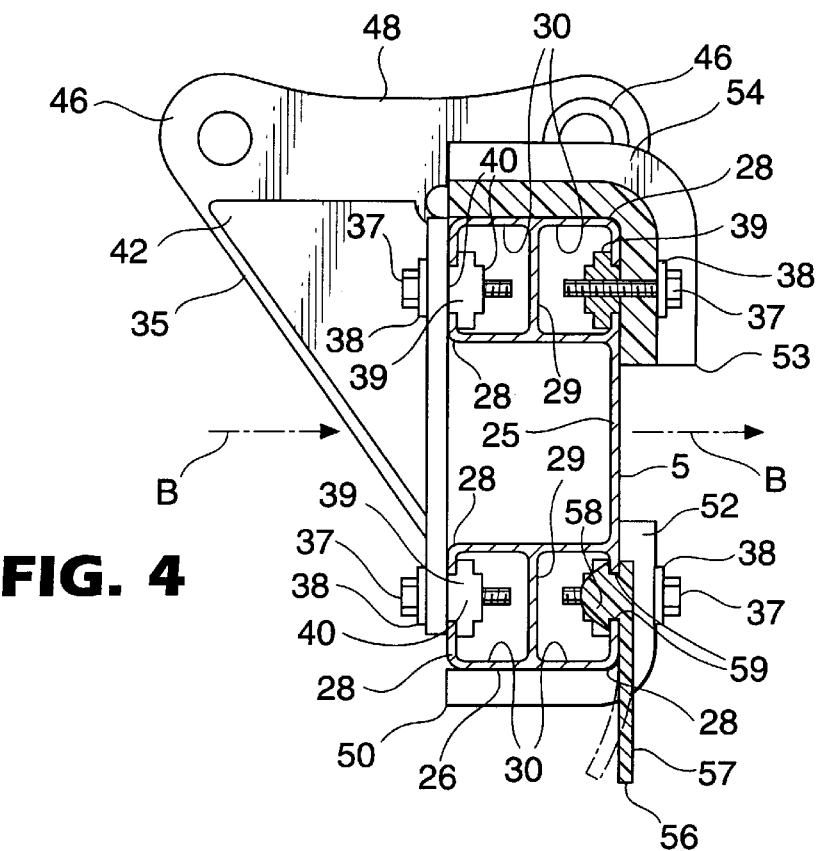
FIG. 4 is cross section of the collector flight of FIGS. 2 and 3.
Figure 5:
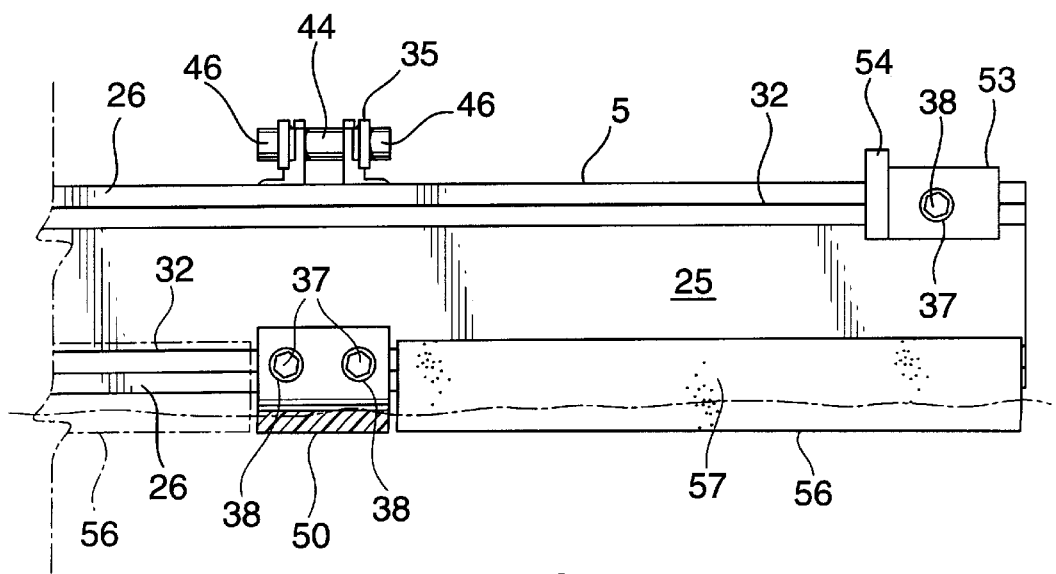
FIG. 5 is a side view of one end of the collector flight of FIGS. 2 and 3 as seen from the right of FIG. 4.

With reference to FIGS. 2 to 4, each flight 5 includes an elongated, one-piece, extruded aluminum body, which is generally C-shaped when viewed from either end or in cross section. The body is defined by a side wall or web 25, which is the front wall in the direction of travel of the flight 5 (see the arrows B in FIG. 4). A hollow, rectangular projection or head 26 is provided at each of the top and bottom ends of the wall 25. It will be appreciated that the body is symmetrical, i.e. the same above and below the longitudinal axis thereof. Accordingly, the choice of a top or bottom end is arbitrary, since the body can be rotated end to end and still be the same.

Each head 26 is generally rectangular in cross section with convex corners 28. A vertical partition 29 is provided in the center of each head 26, dividing the head into two longitudinally extending channels 30. Longitudinally extending slots 32 extend the length of the front and rear, respectively of each head 26 permitting access to the channels 30. As described below, the slots 32 and the channels 30 are used for mounting the flights 5 on the chains 6 and for attaching accessories to the flights.

As mentioned above, in order to move the flights 5 through the tank it is necessary to attach the flights to the chains 6. This is achieved using a connector in the form of a combination link/bracket 35. The bracket 35 includes a rectangular plate 36 which is connected to the flight 5 by bolts 37, washers 38, and nuts 39.

As best shown in FIG. 4, the nuts 39 are rectangular strips of aluminum. The nuts 39 are generally cruciform when viewed from either end or in cross section. Projections 40 defining horizontal arms on the nuts are the same thickness as the front and rear sides of the head 26. The height or width of each projections 40 is only slightly less than the width of the slots 32 so that when the nuts 39 are placed in the channels 30, one of the projections extends into a slot 32. Because of the width of the projection 40, the nut 39 cannot rotate when the bolts 37 are tightened. The length of the nut 39 is approximately the same as the width of the element being connected to the flight 5.

A pair of parallel, generally triangular arms 42 extend outwardly from the plate 26. The outer corners 43 of the arms 42 are interconnected by a integral sleeve 44. Sleeves 46 are provided in free ends 47 of the arms 42. The top ends 48 (in FIG. 4) of the arms 42 act as a link in a chain 6, the sleeves 44 and 46 receiving pins (not shown) for connecting the link/bracket 35 to other links in the chain.

During movement along the bottom of the tank 1, the flights 5 slide on tracks 20. Actually, L-shaped shoes 50 are mounted on the flight 5 for sliding on the tracks 20. A pair of nylon shoes 50 are connected to each flight 5 at the same locations as the links 35, but on the other head 26. Each shoe 50 is connected to the flight 5 using a pair of bolts 37 extending through washers 38 and one arm 52 of the shoe into a nut 39.

A second pair of generally L-shaped, nylon shoes 53 are mounted proximate each end of each flight 5 for sliding on the tracks 21 and 22. The shoes 53 are mounted on the head 26 opposite to the head carrying the shoes 50. Like the shoes 50, the shoes 53 are mounted on the head 26 of the flight 5 using a bolt 37, washer 38 and a nut 39. A flange 54 is provided on the inner end of each shoe 53. The flanges 54 engage the inner side edges of the rails 21 and 22 for preventing lateral movement of the flight 5.

Polyvinyl chloride wipers/skimmers 56 are mounted on the same head 26 as the shoes 50. Each wiper/skimmer 56 is in the form of an elongated, rectangular strip 57 of plastic with a head 58 on one edge thereof. Notches 59 are provided between the head 58 and the strip 57 so that the skimmer can be slid into a slot 32 in the head 26 from either end of the flight. When the wiper/skimmer 56 is on the top run of the chains 6, it skims sludge towards a scum collector (not shown). When the flight 5 and the wiper/skimmer 56 are at the bottom of the tank 1, sediment is pushed along the bottom of the tank into the cross collector trough 3.

I Claim:

1. A collector flight for use in a sewage sedimentation tank which includes chains for moving a plurality of collector flights through sewage in the tank, said collector flight comprising an elongated body; a hollow head on each of top and bottom ends of the body; and a slot extending the length of the front and rear of each said head for receiving connectors for mounting the flight on said chains and for attaching accessories to the body.

2. A collector flight according to claim 1, wherein each said head is substantially rectangular in cross section.

3. A collector flight according to claim 2, wherein said body is substantially C-shaped, including a rectangular web extending between said heads.

4. A collector flight according to claim 3, including a vertical partition extending the length of the interior of each said head, dividing the head into a pair of longitudinally extending channels, said slots permitting access to said channels.

5. A collector flight according to claim 1, wherein said body is a one-piece, aluminum extrusion.

* * * * *